United States Patent [19]

Dale

[11] Patent Number: 5,037,663

[45] Date of Patent: * Aug. 6, 1991

[54] PROCESS FOR INCREASING THE REACTIVITY OF CELLULOSE-CONTAINING MATERIALS

[75] Inventor: Bruce E. Dale, Fort Collins, Colo.

[73] Assignee: Colorado State University Research Foundation, Ft. Collins, Colo.

[ * ] Notice: The portion of the term of this patent subsequent to Jul. 15, 2003 has been disclaimed.

[21] Appl. No.: 474,646

[22] Filed: Feb. 2, 1990

Related U.S. Application Data

[63] Continuation of Ser. No. 225,635, Jul. 27, 1988, abandoned, which is a continuation of Ser. No. 884,767, Jul. 11, 1986, abandoned, which is a continuation-in-part of Ser. No. 311,168, Oct. 14, 1981, Pat. No. 4,600,590.

[51] Int. Cl.$^5$ .............................................. A23K 1/22
[52] U.S. Cl. .................................... 426/69; 426/635; 426/807
[58] Field of Search .................. 127/37; 426/69, 319, 426/442, 447, 448, 807, 635; 162/63, 64, 81, 83, 90, 21, 23

[56] References Cited

U.S. PATENT DOCUMENTS

| | | |
|---|---|---|
| Re. 22,477 | 5/1944 | Millar . |
| 88,515 | 3/1869 | Russell ................................ 162/21 |
| 354,931 | 12/1886 | Pond . |
| 1,586,159 | 5/1926 | Mason ................................ 162/21 |
| 2,167,556 | 7/1939 | Smull . |
| 2,270,326 | 1/1942 | Miller et al. ........................ 260/212 |
| 2,293,845 | 8/1942 | Millar . |
| 2,405,213 | 8/1946 | Heritage ............................. 162/21 |
| 2,580,491 | 1/1952 | Ward . |
| 2,789,906 | 4/1957 | Zick . |
| 2,810,649 | 10/1957 | Bonnell . |
| 3,212,933 | 10/1965 | Hess et al. ............................ 127/37 |
| 3,259,501 | 7/1966 | Ulrey . |
| 3,282,313 | 11/1966 | Schuerch . |
| 3,523,060 | 8/1970 | Herdle et al. . |
| 3,524,451 | 8/1970 | Frederickson . |
| 3,525,667 | 8/1970 | Ingruber et al. . |
| 3,575,178 | 4/1969 | Stewart . |
| 3,612,066 | 10/1971 | Jones et al. . |
| 3,667,961 | 2/1972 | Algeo . |
| 3,707,436 | 12/1972 | O'Connor ............................ 162/9 |
| 3,939,286 | 2/1976 | Jelks . |
| 4,038,481 | 7/1977 | Antrim et al. ...................... 536/56 |
| 4,136,207 | 1/1979 | Bender . |
| 4,163,687 | 8/1979 | Mamers et al. ..................... 162/21 |
| 4,227,964 | 10/1980 | Kerr et al. ........................... 162/9 |
| 4,235,707 | 11/1980 | Burke, Jr. . |
| 4,247,362 | 1/1981 | Williams . |
| 4,356,196 | 10/1982 | Hultquist ............................. 426/69 |

FOREIGN PATENT DOCUMENTS

| | | |
|---|---|---|
| 190840 | 9/1972 | Argentina . |
| 487521 | 12/1973 | Australia . |
| 971067 | 11/1971 | Canada . |
| 169880 | 3/1905 | Fed. Rep. of Germany . |
| 2163249 | 12/1971 | Fed. Rep. of Germany . |
| 2310459 | 9/1974 | Fed. Rep. of Germany ........ 162/54 |
| 2714995 | 4/1977 | Fed. Rep. of Germany . |
| 50-013585 | 7/1975 | Japan . |
| 53-004085 | 1/1978 | Japan . |
| 148326 | 6/1961 | U.S.S.R. . |
| 500058 | 1/1976 | U.S.S.R. . |

OTHER PUBLICATIONS

Barry et al., "X-Ray Studies of Reactions of Cellulose in Non-Aqueous Systems. I. Interaction of Cellulose and Liquid Ammonia", Journal of the Amer. Chem. Soc., vol. 58, 333–37 (1936).

Millett et al., "Modifying Wood to Increase Its In-Vitro Digestibility", Journal of Animal Science, No. 31, 781–788 (1970).

O'Connor, "Ammonia Explosion Pulping a New Fiber Separation Process", TAPPI, vol. 55, No. 3, 353–358 (Mar. 1972).

Baker et al., "Wood and Wood Based Residues in Animal Feeds", Cellulose Technology Research, Chapter 6, 75–87 ASC Symposium No. 10 (1975).

Millett et al., "Pre-Treatments to Enhance Chemical, Enzymatic, and Microbiological Attack of Cellulose Materials", Biotechnology and Bioengineering Symp. No. 5, 193–219 (1975).

Millett et al., "Physical and Chemical Pre-Treatments for Enhancing Cellulose Saccharification", Biotechnology and Bioengineering Symp. No. 6, 125–153 (1976).

Lipinsky, Chapter 1, "Perspectives on Preparation of Cellulose for Hydrolysis", Hydrolysis of Cellulose: Mechanisms of Enzymatic and Acid Catalysis, 1–22, American Chemical Society (1979).

Chen et al., "Extraction of Hemicellulose from Rye Grass Straw for the Production of Glucose Isomerase and Use of the Resulting Straw Residue for Animal Feed", Biotech. and Bioengr., vol. XXII, 519–531 (1980).

Dale and Moreira, "A Freeze-Explosion Technique for Increasing Cellulose Hydrolysis", Biotechnology and Bioengineering Symp. No. 12, 31–43 (1982).

(List continued on next page.)

Primary Examiner—Karen M. Hastings
Attorney, Agent, or Firm—Arnold, White & Durkee

[57] ABSTRACT

This process for increasing the reactivity of cellulose-containing materials such as animal feedstuffs involves contacting the material, in a pressure vessel, with a volatile liquid swelling agent e.g. ammonia, which has a vapor pressure greater than atmospheric pressure at ambient temperatures. The contact is maintained for a time period sufficient for the agent to swell the cellulose of the material. The pressure is then rapidly reduced to atmospheric pressure, thereby causing the agent to boil and explode the material. The rapid pressure reduction also causes some freezing of the cellulose. The swelling agent is separated from said cellulose-containing material and recovered for recycling. The process also increases the water holding capacity of cellulose-containing materials.

8 Claims, No Drawings

OTHER PUBLICATIONS

Peters and Timmerhaus, Plant Design and Economics for Chemical Engineers, Second ed., McGraw-Hill Book Co., pp. 463–464.

Perry and Chilton, Chemical Engineer's Handbook Fifth Edition, pp. 6–16, 3–157 and 3–158.

Perry, Ed., Chemical Engineer's Handbook Third Edition, pp. 315, 576–577, McGraw-Hill Book Co. (1950).

Smith and Van Ness, Introduction to Chemical Engineering Thermodynamics Second Edition, p. 71, McGraw-Hill Book Co. (1959).

Schuerch et al., Liquid Ammonia-Solvent Combinations in Wood Plasticization, Chemical Treatments, I&EC Product Research and Development, vol. 5, No. 2, 101–104 (1966).

Pentoney, Liquid Ammonia-Solvent Combinations in Wood Plasticization, Properties of Treated Wood, I&EC Product Research and Development, vol. 5, No. 2, 105–110 (1966).

Nikitin, The Chemistry of Cellulose and Wood, Academy of Sciences of the USSR, pp. 461–465 (1966).

Gogek et al., "Effect of Preswelling on Durable-Press Performance of Cotton", vol. 39, Textile Research Journal, pp. 543–547 (1968).

Tarkow, A Mechanism for Improving the Digestibility of Lignocellulosic Materials with Dilute Alkali and Liquid Ammonia, Advances in Chem. Sci. #95 (1969).

Warwicker, "H. Swelling", High Polymers, vol. 5, 2nd ed., pp. 325–378 (1971).

Lewin and Roldan, "The Effect of Liquid Anhydrous Ammonia on the Structure and Morphology of Cotton Cellulose", J. Polymer Sci., Part C, No. 36, 213–229 (1971).

Moore et al., Journal of Agricultural Food Chem., vol. 20, No. 6, 1173–1175 (1972).

Schleicher et al., "Changes of Cellulose Accessibility to Reactions in Alkaline Medium by Activation with Ammonia", J. Polymer Sci., pp. 251–260 (1974).

Schleicher et al., "Non-aqueous Solvents of Cellulose", Chemtech, pp. 702–709 (1977).

Cysewski, "Process Design and Economic Studies of Alternative Fermentation Methods for Production of Ethanol", Biotech. and Bioengr., vol. XX, pp. 1421–1444 (1978).

Tsao, Cellulosic Material as a Renewable Resource, Process Biochemistry, pp. 12–14 (1978).

Tsao, "Fermentation Substrates from Cellulosic Materials: Production of Fermentable Sugars from Cellulosic Materials", Annual Reports on Fermentation Processes, vol. 2, pp. 1–21 (1978).

Ben-Ghedalia, The Effect of Chemical Pretreatments and Subsequent Enzymatic Treatments on the Organic Matter Digestibility In Vitro of Wheat Straw, Nutrition Reports International, pp. 499–506 (1979).

Jurasek, Enzymic Hydrolysis of Pretreated Aspen Wood, Dev. Ind. Microbiol. (ISSN 0070-4563) vol. 20 (1979).

Linden et al., "Enzymatic Hydrolysis of the Lignocellulosic Component from Vegetative Forage Crops", Second Symp. on Biotech. in Energy Production and Conversion, Gatlinburg, Tennessee (1979).

"Recommendations on the Treatment of Straw with Liquid Ammonia to Increase Its Feeding Value", Kolos Publishers, Moscow, 1979, pp. 6–9 (fragment).

Sankat, Ammoniation of Corn Stover Stacks to Improve Feed Value, Canadian Agricultural Engineering, pp. 77–80, vol. 22, No. 1 (1980).

Morris, Nutritive Value of Ground and/or Ammoniated Corn Stover, Can. J. Anim. Sci. 60; 327–336 (1980).

Kamstra et al., "Delignification of Fibrous Wastes by Peroxyacetic Acid Treatments"; J. Animal Science, vol. 50, No. 1, 153–159 (1980).

Lechtenberg et al., "Animal Gains on Ammoniated Hay", Indiana Beef Cattle Day, Purdue University (1980).

Saenger et al., "Anhydrous Ammonia Treatment of Corn Stalks", Indiana Beef Cattle Day, Purdue University, 111–116 (1980).

Chahal, Bioconversion of Cellulose and Hemicelluloses of Wood into Fungal Food and Feed with Chaetomium Cellulolyticum, Proceedings of the Second World Congress of Chem. Engr., Montreal, Canada, pp. 245–247 (1981).

Dale, "Protein: The Neglected Component in Biomass Refining", presented at the Annual Meeting of the American Institute of Chemical Engineers, New Orleans, La., Nov. 8–12, 1981.

Dale et al., "Fermentation of Lignocellulosic Materials Treated by Ammonia Freeze-Explosion", Developments in Industrial Microbiology 26:223–233 (1985).

PROCESS FOR INCREASING THE REACTIVITY OF CELLULOSE-CONTAINING MATERIALS

This is a continuation of U.S. patent application Ser. No. 225,635 filed July 27, 1988, now abandoned, and U.S. patent application Ser. No. 884,767 filed July 11, 1986 now abandoned, which is a continuation-in-part of U.S. Ser. No. 311,168 filed Oct. 14, 1981 U.S. Pat. No. 4,600,590.

BACKGROUND OF THE INVENTION

1. Field of the Invention

The present invention is chiefly concerned with processes for increasing the chemical and biological reactivity of cellulose and/or hemicellulose in animal feedstuff materials. More particularly the invention relates to processes for (1) increasing the digestibility of cellulose-containing feedstuffs such as alfalfa press cake, aspen chips, barley straw, corn stover, rice straw, kochia stems, sweet sorghum, wheat chaff, wheat straw, and the like, by ruminant animals and (2) increasing the extraction of protein from within the cells which make up such animal feedstuff materials. This invention is also concerned with processes for increasing the water holding capacity of cellulose-containing materials and with processes for preparing cellulose-containing materials to undergo fermentation.

2. Description of the Invention

Many techniques have been used to increase the chemical and biochemical reactivity of cellulose. A number of factors influence this reactivity. They include particle size and fiber surface area, lignin content, cellulose crystallinity, etc. The prior art techniques used to accomplish this generally can be characterized as either physical or chemical in nature. The physical treatments include ball-milling to very small mesh sizes, two-roll milling and attrition milling. These physical treatments are effective in producing a highly reactive and accessible cellulose component from the material. However, the power requirements for size reduction are so large that such treatments are generally considered prohibitively costly.

Chemical treatments on the other hand usually involve the use of strong bases such as sodium hydroxide, strong acids, and various other cellulose swelling and dissolving agents such as certain transition metal complex cellulose solvents. Such chemical agents are expensive and therefore must be recovered to make these processes economically viable. Furthermore, many of these chemicals are toxic to or otherwise inhibit the biological processes associated with alcohol fermentation or the digestive processes of ruminant animals such as cattle, sheep, etc. Therefore, removal of these chemical agents from the treated cellulose-containing material must be very complete. Such requirements further increase the expense of these prior art chemical treatments. Furthermore, most prior art processes remove their chemical agents by washing with water. This has two major disadvantages. First, water dilutes the cellulose-swelling or dissolving agent to such an extent that the agent can no longer effectively swell the cellulose components of the materials. Hence these chemical agents must be concentrated for reuse; this generally involves considerable capital equipment and operating expense. Second, water is known to promote the recrystallization of decrystallized cellulose. Therefore any cellulose which does recrystallize becomes less reactive. See for example, Millet et al., "Pretreatments to Enhance Chemical, Enzymatic, and Microbiological Attack of Cellulosic Materials," Biotechnol. & Bioeng. Symp. No. 5, 193-219 (1975); and Millet, et al., "Physical and Chemical Pretreatment for Enhancing Cellulose Saccharification," Biotechnol. & Bioeng. Symp. No. 6, 125-153 (1976). Generally, these references discuss various prior art pretreatments of cellulosic materials such as woods and straw, to upgrade their digestibility. These pretreatments include mixing swelling agents with alkaline agents such as sodium hydroxide, primary amines, aqueous or gaseous ammonia and anhydrous ammonia in both liquid and gaseous forms. They also discuss various delignification processes such as the steaming of wood or straw in order to improve digestibility. They also discuss the effects of various physical treatments such as grinding, milling, irradiation, heating and/or compression.

Ammonia is a preferred agent in many of these prior art processes. By way of example, German Patent 169,880 ("the -880 patent") teaches use of relatively low levels of aqueous ammonia (8%), under pressure, to chemically attack lignin containing materials such as straw and wood. The results of chemical attacks of this kind may be one ore more of the following: (1) the addition of nitrogen from the ammonia ("nonprotein nitrogen") to the lignin-containing material for conversion to protein by ruminant animals, (2) the break-up of the lignin material found between the cellulose covered cells of these materials in order to produce products having more amorphous fiber structures and (3) the production of a slow hydrolysis of the material's cellulose components to sugars such as glucose.

Regardless of their end products however, chemical processes like those disclosed in the -880 patent are rather slow; ten hour process times are not uncommon. Moreover, little or no physical attack, as opposed to chemical attack, upon the cellulose cell walls is usually involved. For example, research done after the -880 patent reference disclosure, indicates that an 8% ammonia solution does not produce a physical swelling action upon cellulosic materials of this kind. See for example, Tarkow and Feist, *Advances in Chem.*, Ser. 95, Amer. Chem. Soc., Washington, D.C. Other workers, e.g., Millet and Baker, Biotechnol & Bioeng. Symp. No. 5, 193-219 (1975) have found that the mechanism of digestion of aspen wood by liquid anhydrous ammonia is one of ammonolysis of cross-links of the glucuronic acid ester component of the lignin. This reference specifically notes that in an attempt to exploit this particular ammonolysis mechanism, a number of woods were exposed to anhydrous ammonia in both liquid and gaseous form and that the results were assay ed in terms of changes in in vitro digestibility. These workers found that Aspen appeared to be unique in the extent of its response to ammoniation. It attained a digestibility coefficient of about 50% as contrasted with Sitka spruce and red oak whose ammoniated product digestibilities were only 2 and 10% respectively.

Given these experimental results it appeared that "swelling" per se did not produce improved animal feeds. If this were the case, presumably woods other than aspen also would have become more digestible. Therefore, on balance these references seemed to indicate that ammonia takes part in a chemical attack upon the lignin which holds the cellulose crystalline structure in the materials employed in a given stereoscopic orientation but does not attack the cellulose cell walls of such materials. In other words the "glue" that holds the fibers together appeared to be weakened. However, these processes did not appear to attack the individual cells which make up the fibers. In other words, the cellulose coverings of such cells seem to be, for the most part, left physically intact even though the prior art swelling processes may have succeeded in splitting one set of cellulose fibers (chains of cellulose cells) from other cellulose fibers. In other words, these prior art processes tend to leave the basic unit of the fibers—the cells—intact.

Similarly, the use of ammonia as a swelling agent has been used in other kinds of chemical processes involving cellulosic materials. For example, U.S. Pat. No. 3,707,436 ("the -436 patent") teaches a process for manufacturing paper pulp by (1) impregnating wood chips with anhydrous ammonia, (2) heating the impregnated wood chips within an enclosed space under pressure and (3) suddenly releasing the pressure to cause deformation and disintegration of the chips to a fibrous condition in which the fibers are flexible, kinked, twisted and curled and therefore more susceptible to fibrillation by those mechanical procedures which are applied later in the paper making process. The fibers made by this process are specifically designed for paper making; hence they are characterized by attributes, e.g., possession of relatively light colors, possession of substantially all of the cellulose of the wood chips and susceptibility to delignification and bleaching to a high degree of brightness, attributes which are desired in the paper making field. Moreover, with respect to the subject of ammonia impregnation of the wood chips, the -436 patent teaches that the cellulose fibers can be rendered more plastic, apparently because the disclosed treatment strikes at the lignin glue which holds the cells together and thereby rendering the cellulose contained in the wood somewhat more amorphous and thus somewhat more plastic. This patent also teaches that such plasticity is retained by the product even after the nitrogenous agent is removed. This attribute demonstrates itself particularly well in the presence of heat, hot water and the like in this pulping procedure. This reference does not however concern itself with changing the reactivity of the cellulose for the purpose of enhanced digestibility by animals or for increasing the protein availability of the materials. Furthermore, it makes no suggestion of an increase in the glucose yield upon hydrolysis of the wood chips. This is not surprising since the fibers used in paper pulp operations are not intended to be converted into glucose.

Another treatment which involves both chemical and physical aspects is the so-called Masonite process wherein wood chips are saturated with water under pressure at about 300°-500° F. When the pressure is released, the water evaporates rapidly and the wood fibers tend to separate. This process is similar to what occurs when the moisture inside a popcorn kernel evaporates violently and the kernel greatly expands in volume. The Masonite process is effective in many situations; it does however require considerable amounts of thermal energy in the form of steam. It also has another disadvantage in that some of the plant material is inevitably degraded and made less useful by the high temperatures required. Finally, the moisture content of its resulting products is quite high, on the order of about 50%. See generally U.S. Pat. No. 3,707,346, U.S. Pat. No. 4,235,707, and U.S. Pat. No. 4,135,207.

Therefore, it is a principal object of the present invention to provide an improved method for increasing the chemical and biological reactivity of cellulose and/or hemicellulose in animal feedstuff materials. Another object is to provide a method having these attributes which is cost effective and readily applicable to a variety of feedstuff materials. A further object of this invention is to provide products which are readily adaptable and useful for a variety of purposes including the production of feedstuffs for ruminant animals and the production of raw materials for the production of fermentation products such as alcohols, and the like. This process can also be employed to produce cellulose-containing materials whose water holding capacity is increased. Other objects and advantages of the invention will become apparent from the following detailed descriptions of the preferred embodiments.

SUMMARY OF THE INVENTION

Cellulose and/or hemicellulose containing feedstuff materials can be treated to increase their chemical and biological reactivity by contacting these materials, in a pressure vessel, with liquid ammonia. The weight ratio of ammonia to dry fiber can vary considerably, e.g. from about 0.5 to about 10 parts ammonia to about 1 part material. However, particularly in the context of feedstuffs, a ratio of approximately one to two pounds of ammonia to about 1 pound of dry material is preferred. The other treatment conditions also may vary somewhat. In general the optimum moisture content will be from about 10 to about 40% total moisture on a dry basis with the preferred moisture content being about 30%. Treatment pressures of from about 150 to about 500 psia can be employed; the preferred pressures are about 200 to 300 psia. Similarly, treatment times from about 0.1 to about 2 hours are preferred. Most preferably treatment times of about one half hour or less will be employed. The swelling agent/cellulose material mixture is preferably mixed for a period of time sufficient for the ammonia to wet and swell the cellulose or hemicellulose-containing material. The pressure is then rapidly reduced to atmospheric, allowing the ammonia to boil. Preferably this pressure reducing will take less than about ten seconds and most preferably take place in less than about two seconds. Again, this rapid reduction in pressure serves to cause the cells of the cellulose-containing material to rupture and thereby releases and/or exposes various components of the cells including proteins. Contact of these materials with one or more volatile swelling agent(s) at the boiling point of said agent(s), also serves to freeze the cellulose and hemicellulose containing material. When treatment is completed, the treated material is separated from the liquid and/or gaseous volatile swelling agent and is recovered for reuse.

DESCRIPTION OF THE PREFERRED EMBODIMENTS

The process of this invention preferably comprises first treating cellulose and/or hemicellulose containing materials, such as alfalfa press cake, aspen chips, barley straw, corn stover, rice straw, kochia stems, sweet sorghum, wheat chaff and wheat straw, etc., with a volatile chemical agent such as ammonia at ambient temperatures where the vapor pressure of the agent is greater than atmospheric pressure. Ratios of from about one to about two parts by weight of ammonia to about one part by weight of material are preferred. Contact times of about one half hour or less are also preferred. This is followed by a rapid release of pressure with concomitant explosive rupture of the fibers and/or cells of the cellulose and/or hemicellulose containing material. Most preferably, the reduction to atmospheric pressure within the vessel takes place in less than about two seconds. Such a pressure release allows the ammonia to "boil" within the cellulose-containing material, thereby puffing, exploding or otherwise expanding the structure of the material. Since ammonia "boils" at about $-33.4°$ C. at atmospheric pressure, this treatment also has the effect of freezing the material, and thereby further disrupting the plant material and further promoting the reactivity of cellulose and/or hemicellulose and ease of removal of protein from within the cell structure of these materials.

Most preferably, the cellulose decrystallizing or swelling reaction is caused by ammonia and is carried out at about $-33°$ C. Such a temperature potentially allows the remainder of the ammonia, which was not immediately evaporated, to react even more extensively with cellulose components of cellulose-containing material to help further increase the chemical and biochemical reactivity of such cellulose. The liquid ammonia treatment also serves to further cause a decrease in the total amount of lignin in many cellulose-containing materials as measured by standard techniques. This is an added advantage since lignin is known to inhibit the chemical and biochemical reactivity of cellulose.

The expression "ambient temperature" as used herein will include the temperatures generally encountered in the earth's atmosphere as well as similar room temperatures. Generally such temperatures will fall in the range of from about $-40°$ C. to about 60° C.

Again, the preferred volatile agent is liquid ammonia which boils at $-33.4°$ C. and has a vapor pressure of 8.46 atm. at 20° C. Other less preferred but still viable volatile cellulose-swelling agents would include monomethyl amine, monoethyl amine, other primary and secondary amines, liquid nitrogen dioxide, liquid sulfur dioxide, and the like. Other volatile chemical agent can be used in this invention which do not swell cellulose can also be employed, e.g., liquid carbon dioxide.

The present invention may be further illustrated by the experimental results indicated in Table I. Generally, these results were achieved in experiments using liquid ammonia as the volatile agent. The experiments generally began with the grinding of dried material to the extent that it would pass a 2 mm. screen. The ground material was then treated, in a pressure vessel, with about one pound or less of liquid ammonia under a pressure of about 165 psia at a temperature of about 25° C. After stirring the cellulose-containing material for about one-half hour, a gate valve on the pressure vessel containing the ammonia was opened quickly. A portion of the ammonia (about 20 percent or so) evaporated very rapidly.

In each case, the treatments giving maximum yield of total sugars are compared with sugar yields from an untreated material. The percent of theoretical yield given in the far right-hand column is calculated based on 100% of theoretical yield which represents a complete conversion of cellulose and hemicellulose to monomeric sugars. Since alfalfa, and hence the alfalfa press cake used in this experiment has sources of sugars other than cellulose and hemicellulose, the percent of theoretical conversion is in excess of 100% for that particular material. For essentially all the other materials, the only potential materials present for conversion to sugars are cellulose and hemicellulose. The treatment conditions vary somewhat, but in general the optimum conditions are: moisture content in the amount of about 30% total moisture on a dry basis, an ammonia to dry fiber ratio of approximately 1 to 2 pounds of ammonia to 1 pound of material, 200 to 300 psia and a treatment time of approximately ½ hour or less.

TABLE I

EFFECT OF TREATMENT ON VARIOUS CELLULOSE-CONTAINING MATERIALS

| Material Treated | Sample Number | Total Sugar Yield with 24 hr. Hydrolysis | Percent of Theoretical Yield in 24 hr. |
|---|---|---|---|
| Alfalfa press cake | 5-25-83-3 | 594 | 119 |
| Alfalfa press cake | Untreated | 323 | 65 |
| Aspen chips | 6-22-83-2 | 359 | 44 |
| Aspen chips | Untreated | 58 | 7 |
| Barley straw | 1-3-84-3 | 593 | 83 |
| Barley straw | Untreated | 181 | 25 |
| Corn stover | 6-23-84-4 | 679 | 95 |
| Corn stover | Untreated | 201 | 28 |
| Rice straw | 5-18-83-1 | 584 | 94 |
| Rice straw | Untreated | 204 | 32 |
| Kochia stems | 1-29-84-3 | 401 | 65 |
| Kochia stems | Untreated | 126 | 20 |
| Sweet sorghum | 1-22-85-2 | 646 | 98 |
| Sweet sorghum | Untreated | 213 | 32 |
| Wheat chaff | 3-15-85-1 | 570 | 93 |
| Wheat chaff | Untreated | 165 | 27 |
| Wheat straw | 10-26-83-2 | 637 | 88 |
| Wheat straw | Untreated | 150 | 31 |

Average percent conversion treated - 87
Average percent conversion untreated - 30

Table 2 shows the effect of moisture content on the treatment for eight different cellulose-containing materials. The data indicate that there may not be a sharp optimum in the maximum moisture for best results. Again, the treatment conditions used are approximately 1 to 2 pounds of liquid ammonia per pound of dry fiber, a treatment pressure between 200 and 300 psia and a total treatment time of approximately ½ hour or less.

TABLE 2

EFFECT OF MOISTURE CONTENT ON TREATMENT

| Material Treated | Total Sugar Yield (Mg/Gram Dry Fiber) at Various Moisture Levels (Percent Dry Basis) | | | Maximum Moisture Content Tested to Date (% Dry Basis) | Sugar Yield at Maximum Moisture (Mg/Gram Dry Fiber) |
|---|---|---|---|---|---|
| | Dry | 30 | 50 | | |
| Kochia stems | — | 401 | 383 | 75 | 366 |
| Aspen chips | 311 | 359 | — | 30 | 359 |
| Barley straw | 533 | 610 | — | 35 | 610 |
| Alfalfa press cake (Arco) | 311 | 359 | — | 30 | 359 |
| Corn Stover #1 | 483 | 679 | — | 30 | 679 |
| Cotton Gin Trash | 144 | 199 | — | 30 | 199 |
| Rice Straw | 287 | 584 | — | 30 | 584 |
| Wheat Straw | 560 | 635 | 637 | 30 | 637 |

The fact that no sharp optimum in the moisture content may exist for certain materials is further demonstrated in Table 3, which shows the effect of moisture content on treatment of alfalfa press cake (New Zealand). For this material the moisture content was varied from 7.5% (dry basis) to 233%. The maximum sugar yield was obtained at 40% moisture but there is only a small decrease in total sugar yield when moisture content is increased from 40% to 150%. Thus, the treatment may be effective over quite a wide range of moisture contents. Once again, the corresponding treatment conditions vary in the range of 1 to 2 pounds of ammonia per pound of dry fiber, 200 to 300 psia pressure and ½ hour total treatment time or less.

TABLE 3

EFFECT OF MOISTURE CONTENT ON TREATMENT OF ALFALFA PRESS CAKE (NEW ZEALAND)

| Treatment Sample Number | Moisture Content (% Dry Basis) | Total Sugar Yield (Mg/Gram Dry Fiber) in 24 Hr. Hydrolysis |
|---|---|---|
| 6-15-84-2 | 7.5 | 376 |
| 6-11-84-1 | 30 | 442 |
| 6-1-84-2 | 40 | 451 |
| 10-25-84-2 | 60 | 410 |
| 2-18-86-3 | 100 | 425 |
| 2-18-86-2 | 150 | 412 |
| 3-19-86-3 | 233 | 394 |
| Untreated | 7.5 | 234 | straw, kochia stems, sweet sorghum, wheat chaff and wheat straw, the treatment is applicable to other cellulose-containing animal feedstuff materials as well. In a similar vein, although the preferred agent is liquid ammonia, other volatile cellulose swelling liquids, such as monomethyl and monoethylamine, nitrogen dioxide and sulfur dioxide may also be use. As in the case of ammonia, the heat of vaporization of these other volatile agents is used to lower the temperature of the lignocellulosic material so that more favorable conditions exist for cellulose decrystallization. Also in an analogous manner, the rapid pressure release from these other volatile agents helps disrupt the structure of the lignocellulosic materials as these agents evaporate. Any freezing which may result, depending on the particular volatile agent chosen, can further serve to disrupt the structure of the lignocellulosic material. These factors combine synergistically to produce a more chemically and biochemically reactive cellulose-containing animal feedstuff material from which components such as protein, sugars, hydrocarbons and so forth can be more readily extracted.

It should also be noted that other volatile chemical agents such as liquid carbon dioxide, which are not believed to swell cellulose, may also be used in this way to rupture plant materials of this type with simultaneous freezing. However, some of the more beneficial synergism between explosive rupture of the material, cellulose swelling and reduced temperature will likely be lost with agents which do not swell the cellulose.

This treatment of cellulose-containing animal feedstuff materials with volatile swelling agents, has a number of advantages over prior art processes. One very important advantage is that the treatment is relatively inexpensive. The ammonia-treated material also is more stable with respect to its improved digestibility characteristics for longer periods of time under most commonly encountered conditions. Moreover, the cellulose is left in a highly reactive form which is also more completely converted to monomeric sugars by either acid or enzyme hydrolysis or by microbial action in ruminant animals such as cattle. Since the low digestibility of cellulose and/or hemicellulose in forages such as wheat straw, wheat chaff, corn stover, etc., is the primary limitation in the use of such cellulose-containing materials as energy sources for ruminant animals, such increases in digestibility or reactivity of cellulose are extremely important. Hence, the present invention affords a new approach to animal feeding based on inexpensive lignocellulosic materials.

Regardless of the kind of feedstuff material used, the mechanism of this process is believed to be the same. The structure of the material is expanded and disrupted by the rapid pressure release so as to increase the extractability of valuable plant components such as protein and the accessibility of all reactive agents to the fiber, and other plant components. The freezing caused by the evaporation of the volatile agent further increases the reactivity of the cellulose and increases the extractability of the protein by rupturing large numbers of plant cells. Freezing could also increase the general disruption of the plant material by embrittling the material and making it more easily shattered by the rapidly expanding gases. Furthermore, since no high temperatures are used, degradation products of decreased value are not likely to be formed nor are inhibitors of fermentation likely to be formed.

Furthermore, since the essential characteristic of the agents employed is volatility, they can be readily recovered from the feedstuff material by applying only waste heat of essentially zero value. Their recompression is simple and relatively inexpensive. Ammonia is particularly useful because no third agent such as water need be added to remove the ammonia. This is not necessarily the case with many of the other chemical agents which are capable of increasing cellulose reactivity. This characteristic also tends to prevent cellulose recrystallization caused by the presence of water, which otherwise would reduce the reactivity of the cellulose. Furthermore, the treated cellulosic material is left relatively dry and in a stable state in which the increased reactivity is maintained over many weeks. Therefore, such treated material could conceivably be shipped or stored for significant periods of time without losing the effect of the treatment. By comparison, cellulosic materials treated by other chemical agents which would have to be removed by washing would probably require drying for transport and storage. This of course further increases the expense and inconvenience of such alternative treatments.

Furthermore, it is not necessary to remove all of the ammonia from the feedstuff materials since residual ammonia can serve as a nitrogen source for ruminant animals. It should also be noted that ammonia for feeding ruminant animals such as cattle, or for fermentation processes such as those used to produce alcohols for use as fuels, is not toxic nor carcinogenic as are many other chemical treatment agents for cellulose. Liquid ammonia also exerts a strong antimicrobial action, which reduces the total microbial load of the treated cellulosic material. This fact may allow for the elimination or reduction of sterilization steps for cellulosic materials which are often used in fermentation processes; hence this represents another cost saving factor.

The reduced temperatures which favor and enhance the decrystallizing reaction between the swelling agents and cellulose are produced simply and conveniently in the present invention. All that is necessary to produce the reduced temperatures is to release the pressure on the volatile liquid/cellulosic material system. This evaporates a portion of the volatile swelling agent and rapidly cools the cellulosic material to a temperature at which it may react more favorably with the remainder of the swelling agent. The pressure change and the resultant boiling of the liquid swelling agent within the fiber also causes the cellulosic material to increase in volume in a manner analogous to a popcorn kernel when the water within it boils. This method of decreasing the bulk density of lignocellulosic materials ("puffing" them) at reduced temperatures is preferable to steam explosion or Masonite processes which accomplish an analogous physical expansion of cellulosics at high temperatures since high temperature processes inevitably lead to sugar losses and a general degradation of the lignocellulosic material.

This treatment also appears to actually increase the amount of cellulose measurable in the alfalfa by standard techniques. The removal of lignin and the disruption of the fiber seem to "uncover" cellulose which was not previously measurable. This could further increase the amount of cellulose in the fiber which is available for reaction.

This process also can be used to increase the water holding capacity of many different cellulose materials. These cellulose materials can be both animal feedstuff materials such as those previously discussed or nonfeedstuff cellulose-containg materials. This increased water holding capacity may be used for a variety of commercial and industrial purposes. By way of example only, increased water holding capacity in cellulose-containing materials from which disposable diapers are made would represent an obvious advantage. Tables 4 and 5 demonstrate the effect of this process on the water holding capacity of various cellulosic materials such as cotton linter pulps and wood pulps. These water holding capacities are compared with a commercial absorbent material (diaper lining from disposable diapers). The tests were performed by taking these materials and adding water to them drop-wise in a watch glass until the first drops of free water appeared around the material. In an alternate technique, the bottom of a graduated cylinder was cut off and the cylinder was packed with 0.5 grams of the cellulose-containing material to be tested. Water was again added drop-wise to the top of the graduated cylinder until the first free drop of water appeared at the bottom of the cylinder. The second technique tended to give somewhat higher overall estimates of the water holding capacity of the material, but the general trends conclusively indicate greater water holding capacity. Hence, the general process used for increasing the reactivity of cellulose-containing materials as feedstuffs can also be used to increase the ability of cellulose-containing materials to hold water. In these particular examples the ammonia treated cotton and wood pulps were treated at 300 psi and an ammonia to dry fiber ratio of 10 to 1 for ½ hour. However, ammonia to fiber ratios in the range of one to ten pounds of liquid ammonia pr pound of dry fiber were investigated. Generally an increasing trend in moisture holding capacity with increasing ammonia levels was observed.

TABLE 4

Effect of Treatment On Water-Holding Capacity of Purified Cellulosic Materials

| Material | Water-Holding Capacity gm/gm dry fiber | |
|---|---|---|
| | Watch Glass | Graduated Cylinder |
| Cotton linter pulp-Ammonia treated | 13.2 | 13.3 |
| Cotton linter pulp- | 10.9 | 11.8 |

TABLE 4-continued

Effect of Treatment On Water-Holding Capacity of Purified Cellulosic Materials

| Material | Water-Holding Capacity gm/gm dry fiber | |
|---|---|---|
| | Watch Glass | Graduated Cylinder |
| untreated | | |
| Wood pulp-Ammonia treated | 15.0 | 15.7 |
| Wood pulp-untreated | 10.6 | 13.4 |
| Commercial absorbent material | 10.3 | 11.7 |

TABLE 5

| Substrate | Psig. for ½ hr. | [gNH$_3$]/[g. dry fiber] | Fraction of dry matter before treatment |
|---|---|---|---|
| Diaper liner* | — | — | .9568 |
| C.L.P. | 250 | 1:1 | .9701 |
| C.L.P. | 300 | 2:1 | .9701 |
| C.L.P. | 250 | 6:1 | .9701 |
| C.L.P. | 300 | 10:1 | .9701 |
| C.L.P. (untreated) | — | — | .9701 |
| W.P. | 250 | 1:1 | .9561 |
| W.P. | 300 | 2:1 | .9561 |
| W.P. | 250 | 6:1 | .9561 |
| W.P. | 300 | 10:1 | .9561 |
| W.P. (untreated) | — | — | .9561 |

| Substrate | Fraction of dry matter after treatment | Watch glass gH$_2$O/g dry fiber | Graduated gH$_2$O/g dry fiber |
|---|---|---|---|
| Diaper liner* | — | 10.26 | 11.70 |
| C.L.P | .9674 | 11.10 | 11.99 |
| C.L.P | .9613 | 12.77 | 12.52 |
| C.L.P. | .9404 | 12.96 | 13.22 |
| C.L.P. | .9403 | 13.21 | 13.27 |
| C.L.P. (untreated) | — | 10.93 | 11.85 |
| W.P. | .9573 | 13.36 | 13.79 |
| W.P. | .9560 | 13.97 | 14.68 |
| W.P. | .9417 | 14.56 | 15.08 |
| W.P. | .9276 | 15:01 | 15:74 |
| W.P. (untreated) | — | 10.58 | 13.38 |

*Huggies
C.L.P. = cotton linter pulp
W.P. = wood pulp

While certain illustrative methods, compositions and embodiments of the present invention are described above, it should be understood that there is no intention to limit the invention to the specific forms thereof disclosed. On the contrary, the intention is to cover all modifications, alternatives, equivalents and uses falling within the spirit and scope of the invention as expressed in the appended claims.

What I claim is:

1. A method for increasing the reactivity of cellulosic materials, comprising:
   a. contacting cellulose-containing material with liquid ammonia in a pressure vessel;
   b. mixing said cellulose-containing material and liquid ammonia in said pressure vessel absent the application of thermal energy to the pressure vessel and its contents above the ambient air temperature surrounding the pressure vessel, at a pressure of at least the vapor pressure of liquid ammonia for the temperature in the pressure vessel, and for a time sufficient to wet and swell with liquid ammonia substantially all the cellulose in said material; and c. reducing rapidly the pressure inside said pressure vessel to a point sufficient to boil liquid ammonia and explode or rupture the cellulose fiber structure.

2. A method for increasing the reactivity of cellulosic materials, comprising:

a. mixing cellulose-containing material and liquid ammonia in a pressure vessel;

b. pressurizing said mixture at a temperature in the pressure vessel about equal to the room temperature surrounding the pressure vessel, at a pressure substantially equal to or greater than the vapor pressure of liquid ammonia at said temperature, and for a time sufficient for the liquid ammonia to swell the cellulose in said cellulose-containing material; and c. substantially instantaneously vaporizing at least a portion of said liquid ammonia by rapidly lowering the pressure inside said pressure vessel to explode or rupture the cellulose fiber structure.

3. The method of claim 1 or 2 wherein said pressure reduction is to atmospheric pressure.

4. The method of claims 1 or 2 wherein said cellulosic or cellulose-containing material is left in contact with said ammonia after said pressure reduction in order to further react the cellulose with ammonia.

5. The method of claim 1 or 2 further comprising recovering the volatized ammonia after said rapid pressure reduction.

6. The method of claim 5 further comprising recycling the ammonia for further processing of cellulose-containing material.

7. The method of claims 1 or 2 further comprising hydrolyzing said cellulose-containing material after said liquid ammonia pressure treatment.

8. The method of claims 1 or 2 further comprising fermenting said cellulose-containing material after said liquid ammonia pressure treatment.

* * * * *